(12) United States Patent
Sugai

(10) Patent No.: US 10,970,021 B2
(45) Date of Patent: Apr. 6, 2021

(54) INFORMATION PROCESSING APPARATUS AND CONTROL METHOD TO ENABLE A USER TO SPECIFY THE NUMBER OF IMAGES TO BE COMBINED IN A FRAME

(71) Applicant: CANON KABUSHIKI KAISHA, Tokyo (JP)

(72) Inventor: Yousuke Sugai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/274,113

(22) Filed: Feb. 12, 2019

(65) Prior Publication Data

US 2019/0250864 A1    Aug. 15, 2019

(30) Foreign Application Priority Data

Feb. 15, 2018   (JP) .............................. JP2018-025492

(51) Int. Cl.
  *G06F 3/12*  (2006.01)
  *H04N 1/00* (2006.01)
  *G06T 3/40*  (2006.01)

(52) U.S. Cl.
  CPC .......... *G06F 3/1258* (2013.01); *G06F 3/1205* (2013.01); *G06F 3/1287* (2013.01); *G06T 3/4038* (2013.01); *H04N 1/0044* (2013.01); *H04N 1/00464* (2013.01)

(58) Field of Classification Search
  CPC .... G06F 3/1258; G06F 3/1287; G06F 3/1205; G06F 3/125; H04N 1/0044; H04N 1/00464; H04N 1/00456; G06T 3/4038

USPC ......................................................... 358/1.15
See application file for complete search history.

(56) References Cited

U.S. PATENT DOCUMENTS

| | | | | |
|---|---|---|---|---|
| 2011/0029552 | A1* | 2/2011 | Whitby ................... | G06T 11/60 707/769 |
| 2012/0307294 | A1* | 12/2012 | Matsuda ............... | G06F 3/1219 358/1.15 |
| 2013/0163048 | A1* | 6/2013 | Kida ..................... | G06F 3/1296 358/1.15 |
| 2013/0321856 | A1* | 12/2013 | Bell ........................ | G06F 3/122 358/1.15 |

FOREIGN PATENT DOCUMENTS

| | | |
|---|---|---|
| JP | 2002-297745 A | 10/2002 |
| JP | 2008-1024 A | 1/2008 |
| JP | 2013-178768 A | 9/2013 |
| JP | 2014-040078 A | 3/2014 |
| JP | 2014-104625 A | 6/2014 |

* cited by examiner

*Primary Examiner* — Kent Yip
(74) *Attorney, Agent, or Firm* — Canon U.S.A., Inc. IP Division

(57) ABSTRACT

An information processing apparatus enables a user to easily grasp the number of images to be combined to a frame. In a case where a plurality of images are combinable to a frame selected by using a communication application, a request message to request transmission of a plurality of images is transmitted via a network.

23 Claims, 19 Drawing Sheets

FIG.7

| COMMUNICATION USER ID | CONVERSATION STATE | SELECTED FRAME |
|---|---|---|
| U00001 | NONE | NONE |
| U00002 | PICTURE POST WAITING | FRAME A |
| U00003 | CONFIRMATION WAITING | FRAME B |
| U00004 | NONE | NONE |

FIG.8

| JOB ID | URL |
| --- | --- |
| J00001 | http://PRINT JOB STORAGE SERVER/jobdb/00001 |
| J00002 | http://PRINT JOB STORAGE SERVER/jobdb/00002 |
| J00003 | http://PRINT JOB STORAGE SERVER/jobdb/00003 |
| J00004 | http://PRINT JOB STORAGE SERVER/jobdb/00004 |

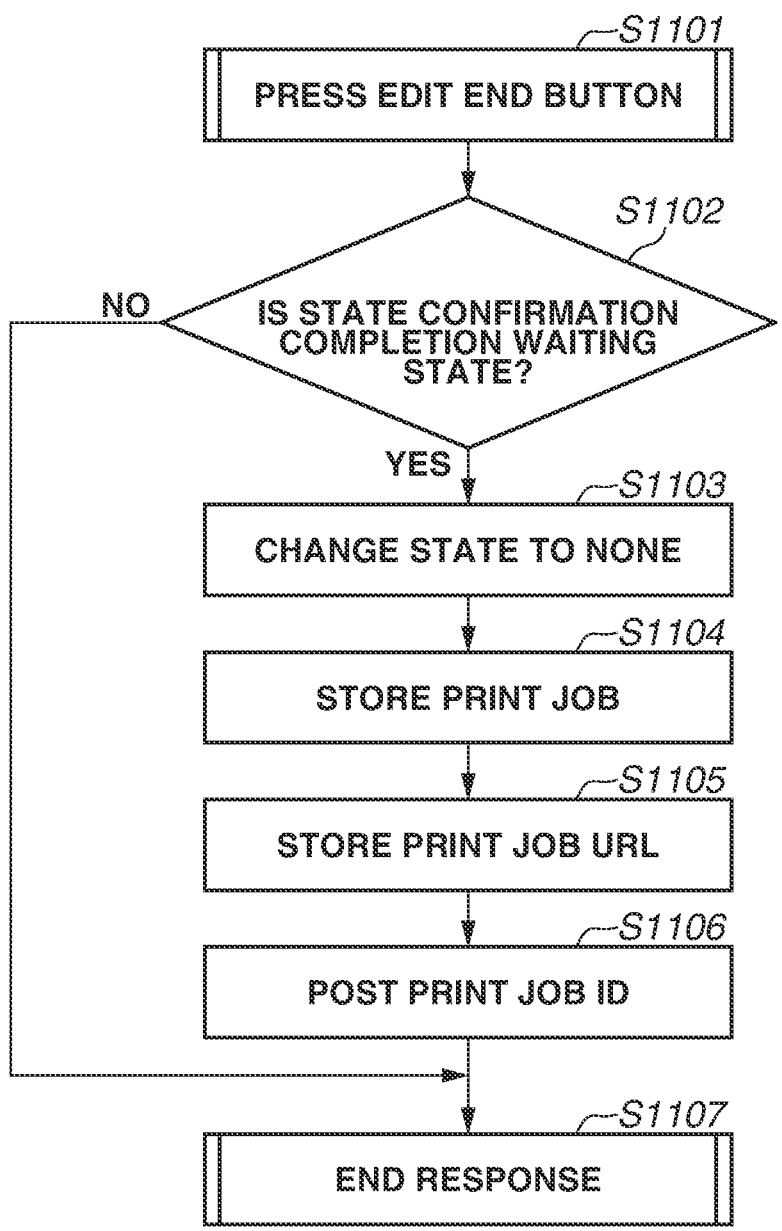

FIG.16

```
{
    "USER LIST":[
        {
            "USER ID": "0001",
            "STATE": "NONE",
            "SELECTED FRAME INFORMATION": null
        }, {
            "USER ID": "0002",
            "STATE": "IMAGE POST WAITING",
            "SELECTED FRAME INFORMATION": {
                "FRAME ID": "A",
                "NUMBER OF SLOTS": 2,
                "SLOT LIST": [
                    {"SLOT 1": null},
                    {"SLOT 2": null},
                ]
            }
        }, {
            "USER ID": "0003",
            "STATE": "IMAGE POST WAITING",
            "SELECTED FRAME INFORMATION": {
                "FRAME ID": "A",
                "NUMBER OF SLOTS": 2,
                "SLOT LIST": [
                    {"SLOT 1": "POSTED IMAGE 1.jpg"},
                    {"SLOT 2": null},
                ]
            }
        }, {
            "USER ID": "0004",
            "STATE": "IMAGE POST WAITING",
            "SELECTED FRAME INFORMATION": {
                "FRAME ID": "B",
                "NUMBER OF SLOTS": 3,
                "SLOT LIST": [
                    {"SLOT 1": null},
                    {"SLOT 2": null},
                    {"SLOT 3": null},
                ]
            }
        },
    ]
}
```

INFORMATION PROCESSING APPARATUS AND CONTROL METHOD TO ENABLE A USER TO SPECIFY THE NUMBER OF IMAGES TO BE COMBINED IN A FRAME

BACKGROUND

Field of the Disclosure

The present disclosure relates to an information processing apparatus, a control method, and a storage medium.

Description of the Related Art

There is a communication application for performing a conversation with others by transmitting and receiving character data or image data through network communication. In addition, Japanese Patent Application Laid-Open No. 2008-1024 discusses a technique for creating a combined image by assigning an image to a frame.

However, in a case where the number of frames (also referred to as slots) to which images are assigned is varied depending on a frame selected by a user, the user cannot easily understand the number of pictures to be selected, which may deteriorate operability.

SUMMARY

According to an aspect of the present disclosure, an information processing apparatus that communicates, via a network, with a user terminal in which a communication application is installed includes a reception unit configured to receive, via the network, frame identification information of a frame to be combined to an image and selected by a user using the communication application of the user terminal, a transmission unit configured to transmit, via the network, a request message to request transmission of a plurality of images in a case where a plurality of images is combinable to the frame corresponding to the received frame identification information, and a second reception unit configured to receive the plurality of images. A combined image in which the plurality of images received by the second reception unit has been assigned to the frame corresponding to the frame identification information is printed by a printing apparatus.

Further features of the present disclosure will become apparent from the following description of exemplary embodiments with reference to the attached drawings.

BRIEF DESCRIPTION OF THE DRAWINGS

FIG. 7 is a table illustrating an example of a conversation state storage database (DB).

FIG. 8 is a table illustrating an example of a print job uniform resource locator (URL) management DB.

FIG. 11 is a flowchart illustrating processing executed by the bot server.

FIG. 16 is a diagram illustrating an example of data stored in the conversation state storage DB.

DESCRIPTION OF THE EMBODIMENTS

Figure 1:
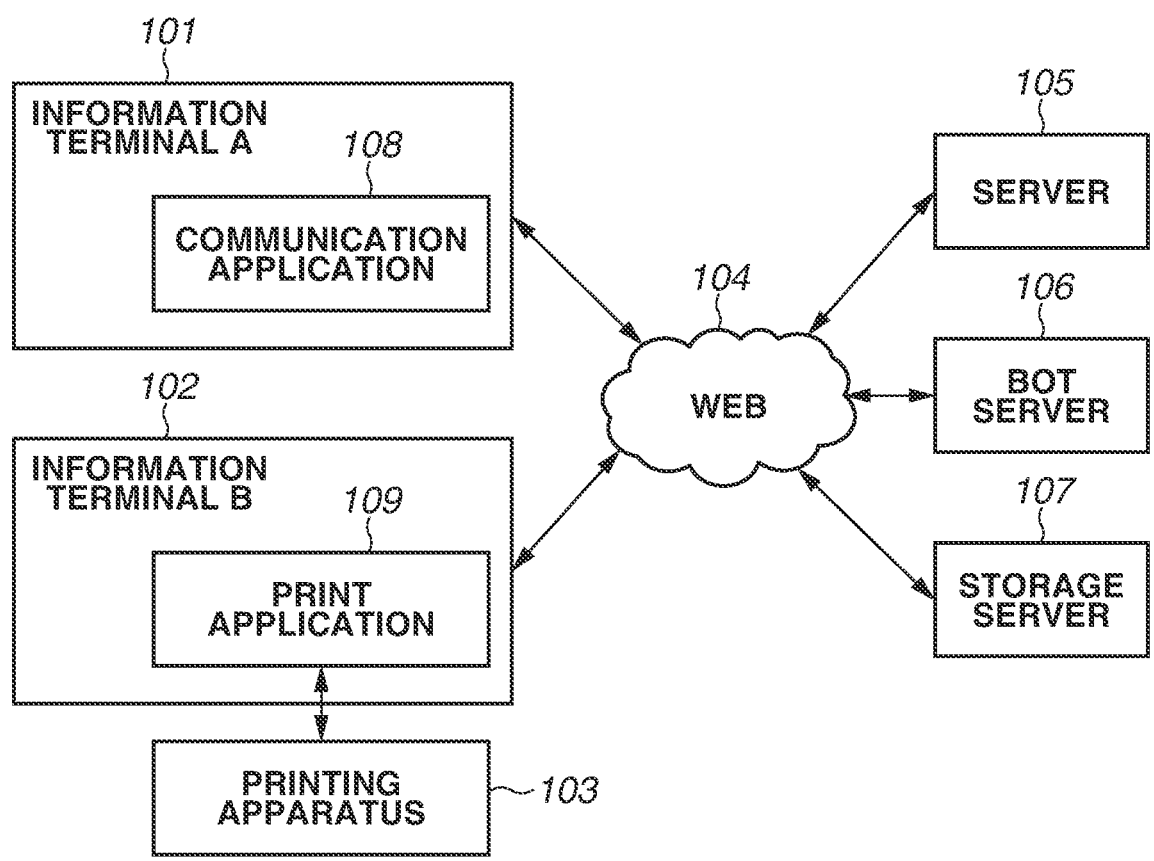
FIG. 1 is a block diagram illustrating an example of a system configuration.

FIG. 1 is a block diagram illustrating an example of a system configuration according to a first exemplary embodiment. An information terminal A 101 includes a communication application 108 used by a user. An information terminal B 102 is placed in a public space, and a print application 109 to perform printing is installed in the information terminal B 102. The information terminal B 102 is connected to a printing apparatus 103. The information terminal A 101 is also referred to as a user terminal because the information terminal A 101 is used by the user. A server 105 controls data communication with the communication application 108.

A bot server 106 performs data communication with the information terminal A 101 via the server 105. When the user registers a bot to the communication application 108 and transmits a message or the like to the bot, the message is transmitted to the bot server 106 via the server 105. The bot server 106 can transmit, to the information terminal A 101, a message responding to the received message via the server 105. The bot server 106 is also referred to simply as an information processing apparatus. The bot server 106 may be implemented by one apparatus or by a plurality of apparatuses in cooperation.

A storage server 107 stores a print job used for printing. The print job includes print setting information and image data to be printed.

These apparatuses are connected via a web 104, and the communication application 108 operates while communicating with the server 105. If receiving a print instruction from the user, the bot server 106 stores a print job including an image and a print setting in the print job storage server 107. The print application 109 acquires the print job from the print job storage server 107 and performs printing by using the printing apparatus 103. The web 104 is also referred to simply as a network or the Internet. As illustrated in FIG. 1, the apparatuses are communicably connected to one another via the web (network) 104. The printing apparatus may be of an inkjet system, an electrophotographic system, or another system.

Figure 18:
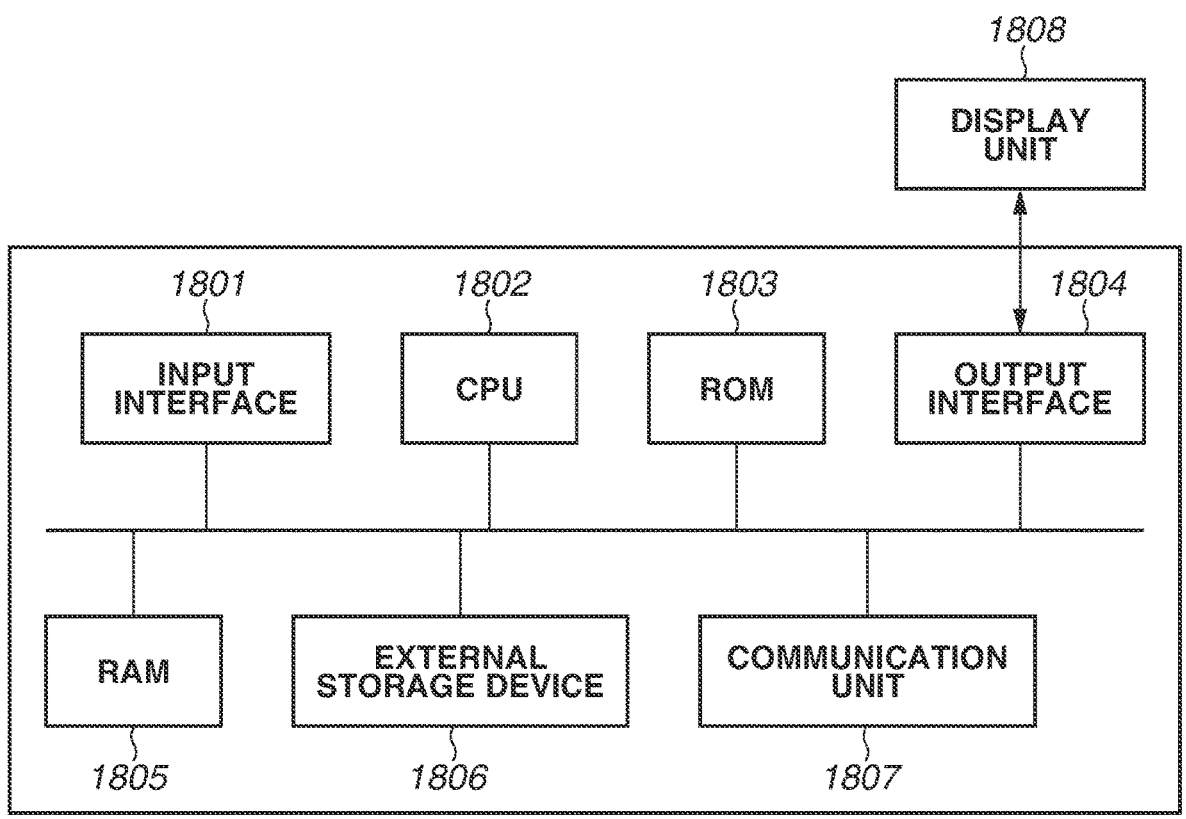
FIG. 18 is a block diagram illustrating a hardware configuration of the bot server.

A hardware configuration of the bot server 106 is described with reference to FIG. 18. The bot server 106 includes an input interface 1801, a central processing unit (CPU) 1802, a read-only memory (ROM) 1803, an output interface 1804, a random access memory (RAM) 1805, an external storage device 1806, a communication unit 1807, and a display unit 1808.

The input interface 1801 is an interface to receive data and an operation instruction from the user, and includes a physical keyboard, buttons, a touch panel, etc. The output interface 1804 (described below) and the input interface 1801 can have the same configuration, and screen output and reception of operation from the user may be performed with the same configuration.

The CPU 1802 is a system control unit that controls the entire bot server 106.

The ROM 1803 stores fixed data such as a control program executed by the CPU 1802, a data table, and a built-in operating system (hereinafter, referred to as OS) program. In the present exemplary embodiment, the control program stored in the ROM 1803 performs software execution control such as scheduling, task switching, and interruption processing under the control of the built-in OS stored in the ROM 1803.

The RAM 1805 includes a static random access memory (SRAM) that requires a backup power supply. In the RAM 1805, data is held by using a primary battery (not illustrated) for data backup. Thus, the RAM 1805 can store important data such as program control variables in a non-volatile manner. A memory area that stores setting information, management data, etc. of the bot server 106 is also provided in the RAM 1805. The RAM 1805 is also used as a main memory and a working memory for the CPU 1802.

The external storage device 1806 stores various kinds of programs and various kinds of information used by the programs.

The output interface 1804 performs data display on the display unit 1808.

The communication unit 1807 communicates with another apparatus via the web 104.

Figure 2:
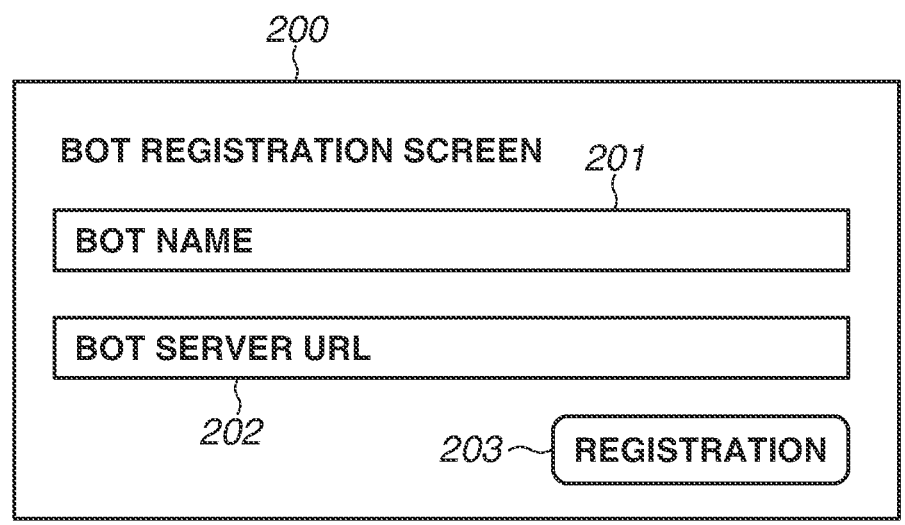
FIG. 2 is a diagram illustrating an example of a bot registration screen.

FIG. 2 illustrates a screen to register a bot server to the server 105. For example, if a personal computer (PC) (not illustrated) accesses the server 105, a registration screen 200 of FIG. 2 is provided to a screen of the PC by the server 105. An administrator of the bot server enters a bot name 201 and a bot server uniform resource locator (URL) 202 on the registration screen, and presses a registration button 203. Through the above-described processing, the bot server 106 is registered to the server 105, and the user of the information terminal A 101 can register the bot server 106 as one of virtual users by using the communication application 108.

Figure 3:
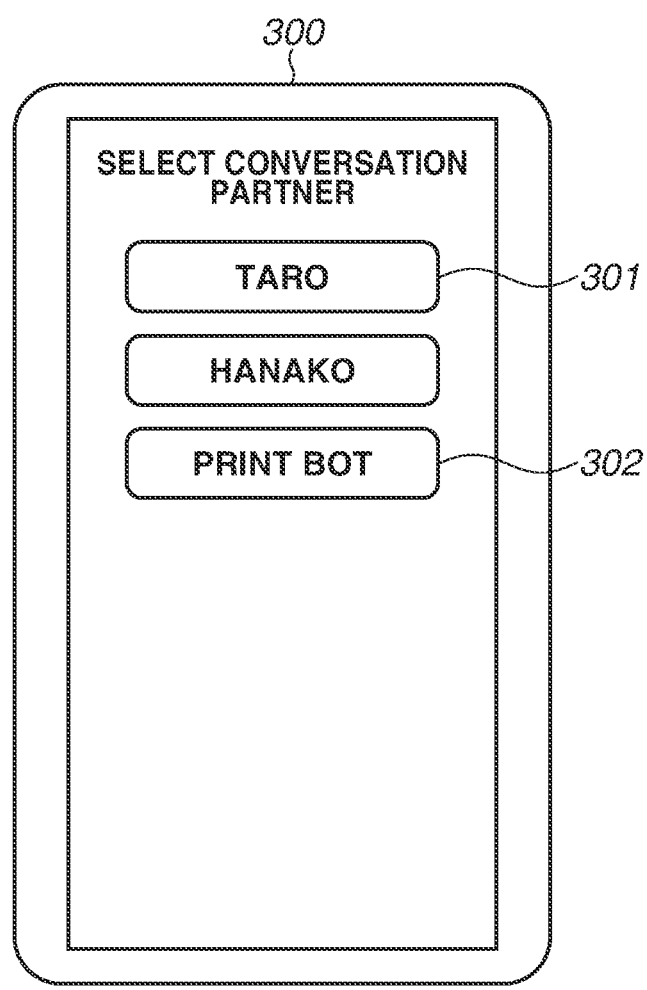
FIG. 3 is a diagram illustrating an example of a selection screen provided by a communication application.

FIG. 3 illustrates a selection screen 300 provided by the communication application 108. The user selects a conversation partner on the selection screen 300.

In a case where a conversation partner button 301 is selected, a screen transitions to a screen for conversation with a partner corresponding to the selected button. In a case where a conversion partner button 302 is selected, the screen transitions to a screen for conversation with a bot. As described above, a message displayed on the screen for conversation with the bot is transmitted from the bot server 106.

Figure 4:
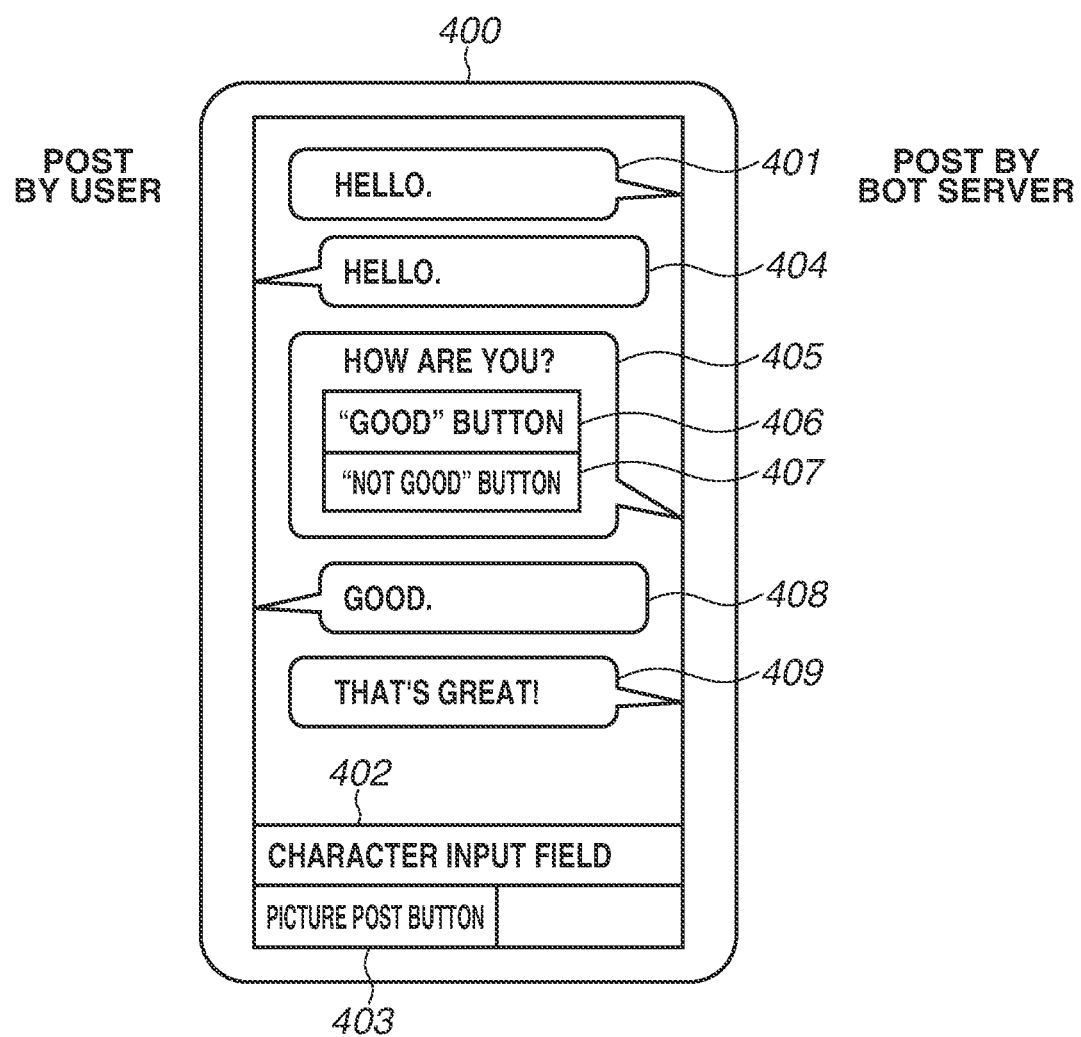
FIG. 4 is a diagram illustrating an example of a conversation screen provided by the communication application.

FIG. 4 illustrates a screen 400 for conversation with the bot displayed by the communication application 108. On the conversation screen 400, a message 401 transmitted from the bot server 106 and a message 404 transmitted by the user are displayed. In the present exemplary embodiment, a message in a speech balloon from the right side is posted by the bot, and a message in a speech balloon from the left side is posted by the user in FIG. 4. The user enters a message in a character input field 402 and transmits the message, thereby posting the message as the conversation. Further, in a case where the user selects a picture post button 403, the user can post any image and picture as a content of the conversation.

In a case where the bot posts a script as the conversation, a simple graphical user interface (GUI) such as a button is displayed. For example, a message 405 is transmitted from the bot server 106 to ask how the user is feeling, and includes a "GOOD" button 406 and a "NOT GOOD" button 407. If the user selects either of the buttons, a message corresponding to the selected button is displayed thereon. For example, if the user presses the good button 406, a message 408 indicating "GOOD" is transmitted to the bot. The bot can post a message 409 in response to the message 408.

Figure 5:
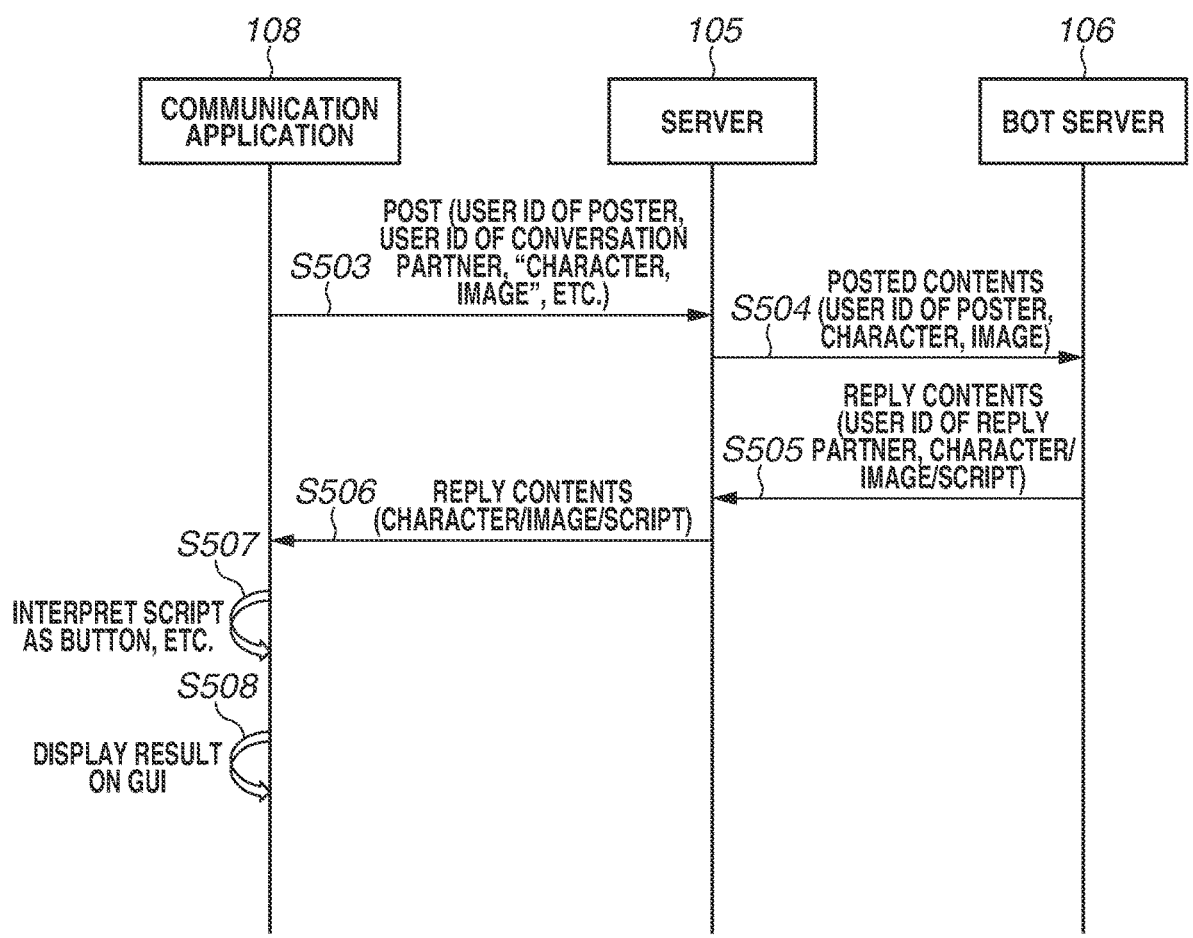
FIG. 5 is a diagram illustrating a processing sequence.

FIG. 5 is a diagram illustrating a processing sequence of data communication between the communication application 108, the server 105, and the bot server 106.

In step S503, the message transmitted by the user is transmitted to the server 105 together with a user ID of a poster (uploading user), and a user ID of a conversation partner. The server 105 identifies the conversation partner based on the user ID of the partner. In a case where the bot server 106 is identified as the conversation partner, in step S504, the server 105 transfers the received message and the user ID of the poster to the bot server 106. In step S505, the bot server 106 returns, as a reply thereto, a character, an image, or another script together with a user ID of a reply partner who is to receive the reply to the server 105. In step S506, the server 105 transmits posted contents received from the bot server 106 to the communication application 108 corresponding to the user ID of the reply partner. Then, the communication application 108 displays the received posted contents. In a case where a script is included in the posted contents, the communication application 108 executes processing based on the script and displays a button in steps S507 and S508.

Figure 6:
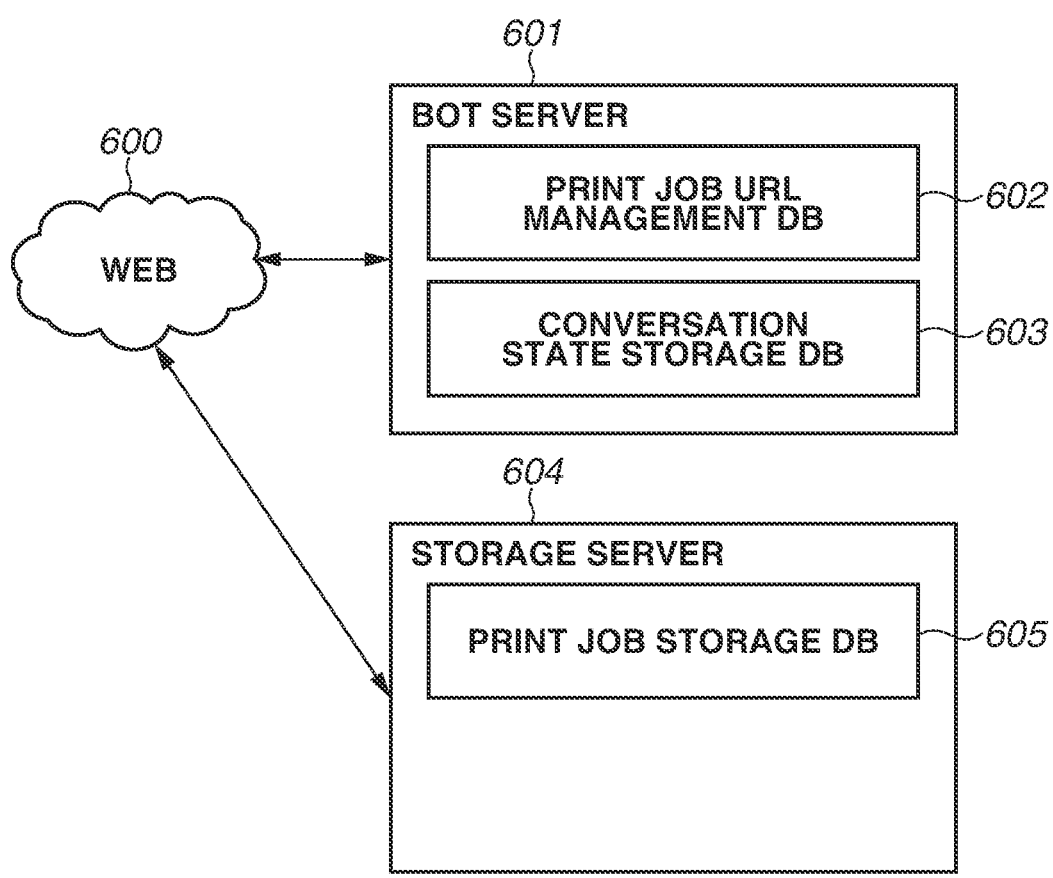
FIG. 6 is a block diagram illustrating an example of configurations of a bot server and a storage server.

FIG. 6 illustrates configurations of a bot server 601 and a storage server 604. The bot server 601 includes the function same as the function of the bot server 106, and the storage server 604 includes the function same as the function of the storage server 107. The bot server 601 receives data and transmits data to a target server via a web 600. The storage server 604 similarly includes transmission/reception functions. The bot server 601 includes a conversation state storage database (DB) 603 storing a conversation state, and a print job URL management DB 602 managing a storage destination of a print job. The storage server 604 includes a print job storage DB 605 storing a print job. When the storage server 604 is accessed using a specific URL, the storage server 604 reads the print job in the DB and transmits the print job to an access source.

FIG. 7 illustrates an example of the conversation state storage DB 603. In the DB 603, an ID of a user who performs conversation on the communication application and the conversation state thereof are stored. In a case where a frame is selected, information about the selected frame is also stored. The frame includes a slot to which an image is assigned. Thus, the frame is to be combined with the image. In a case where the frame includes one slot, the number of images combinable to the frame is one. In a case where the frame includes a plurality of slots, a plurality of images is combinable to the frame.

FIG. 8 illustrates an example of the print job URL management DB 602. In the DB 602, a job ID and a URL indicating the storage destination of the job are stored.

Figure 9:
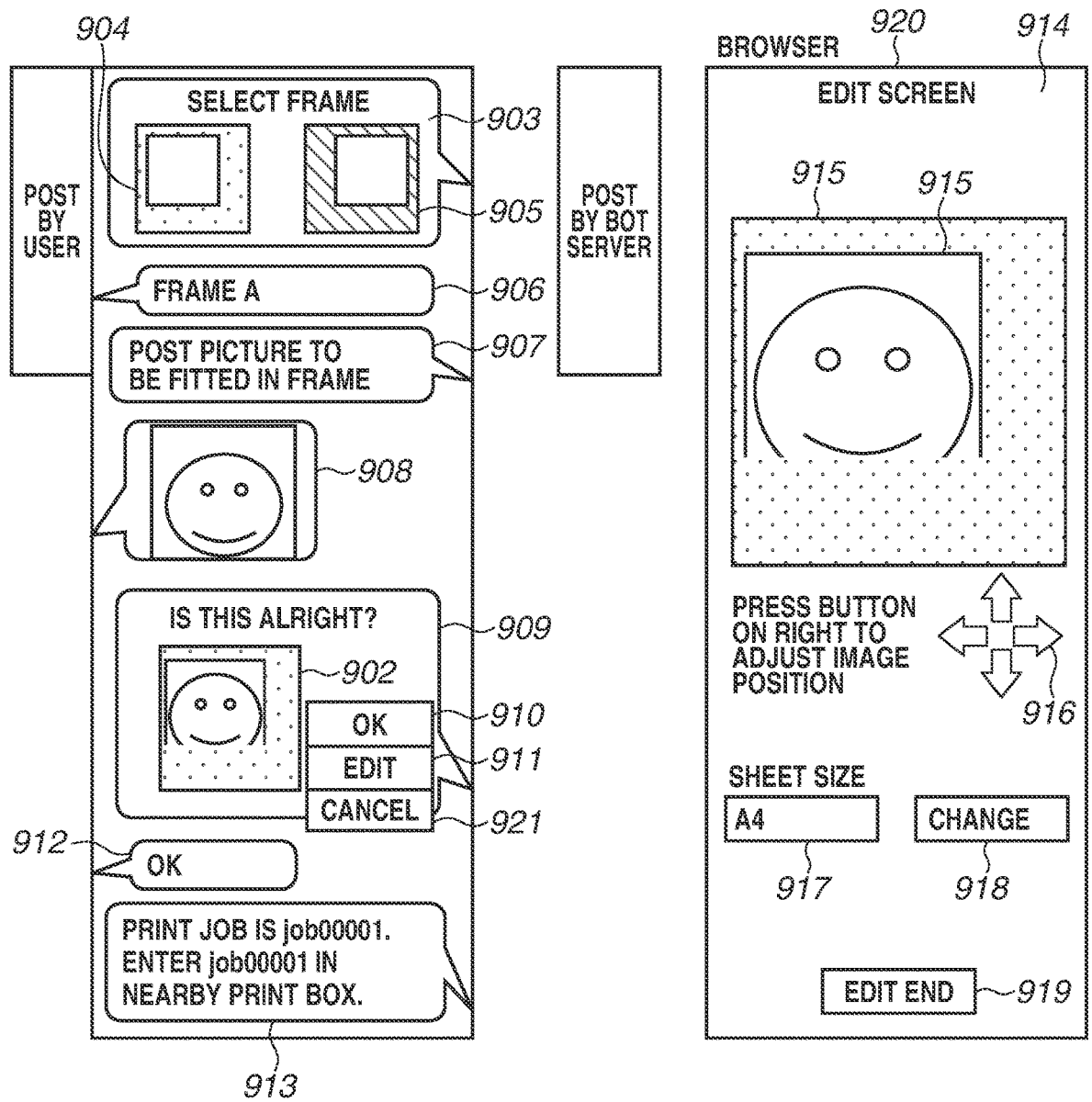
FIG. 9 is a diagram illustrating an example of a conversation screen provided by the communication application.

FIG. 9 is a diagram illustrating an example of a conversation screen of the print bot and the user. The bot server 106 first posts a message 903 that includes a function button that prompts the user to select a frame in which a picture is to be fitted. In a case where a button 904 is selected, a message "frame A" is transmitted. In a case where a button 905 is selected, a message "frame B" is transmitted.

In FIG. 9, for example, by the user pressing the button 905, a message 906 including frame identification information "FRAME A" is posted by the user, and the bot server 106 transmits a message 907 to request posting of a picture to be fitted in the frame.

While the message 907 is transmitted, the bot server 106 sets "FRAME A" as the selected frame information and "PICTURE POST WAITING" as the conversation state in the conversation state storage DB 603.

When the user posts a message 908 including a picture, the bot server 106 creates an image 902 in which the picture has been fitted in the frame A, and posts a message 909 for prompting the user to perform confirmation. The message 909 includes an OK button 910 and an edit button 911. The edit button is also referred to as an edit instruction item. In a case where the OK button 910 is selected, a message "OK" is posted.

On the other hand, in a case where the edit button 911 is selected, a web page based on an external URL is displayed. In a case where a message 912 indicating "OK" is posted, the bot server 106 stores, in the print job storage DB 605, the image in which the picture has been fitted in the frame A, and stores, in the print job URL management DB 602, the URL indicating the storage destination and the job ID. Further, the bot server 106 posts a message 913 including the job ID for the user. When the print job is stored in the storage server 107, the storage server 107 notifies the bot server 106 of the URL indicating the storage destination of the print job. The bot server 106 can store, in the print job URL management DB 602, the URL indicating the storage destination and the job ID by issuing the job ID to the received URL. In the case where the edit button 911 is selected, a URL associated with the edit button 911 is notified to a browser 920, and an edit screen 914 that is a web page provided by the bot server 106 is displayed on the browser 920.

A preview image 915 in which the picture has been fitted in the frame is displayed on the edit screen 914. In a case where the user checks the preview image 915 and wants to correct the image, the user can adjust a position of the picture relative to the frame using an image position adjustment button 916. Information about a sheet to be used for printing is displayed in a print sheet size field 917. In a case where the user wants to change the sheet size, the user can change the sheet size by selecting a "CHANGE" button 918. The change button is also referred to as a change instruction item. When the user presses an "EDIT END" button 919, the bot server 106 stores the image reflecting editing performed on the edit screen in the print job storage DB 605. At this time, the bot server 106 further stores the URL indicating the storage destination and the job ID in the print job URL management DB 602.

Then, the bot server 106 posts the message 913 including the job ID for the user. In the present exemplary embodiment, the user can correct the position of the image and change the sheet size on the edit screen 914; however, the user may also perform other changes. For example, an instruction to enlarge or reduce the image may be received on the edit screen 914. In addition, the print setting information that can be changed on the edit screen 914 may include at least one of a sheet size, a sheet type, double-sided print setting, single-sided print setting, and color information. The color information includes density, brightness, and chroma.

Figure 10A:
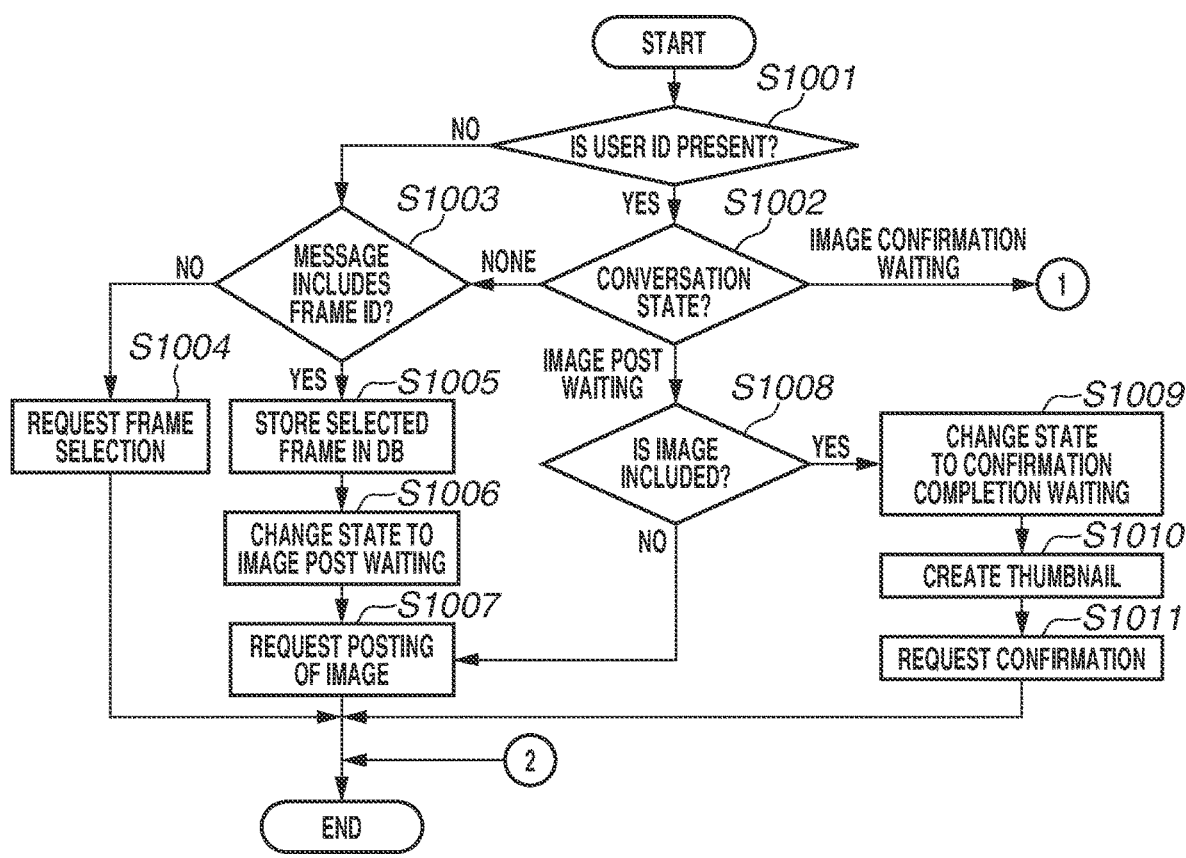
FIGS. 10A and 10B are flowcharts illustrating processing executed by the bot server.
Figure 10B:
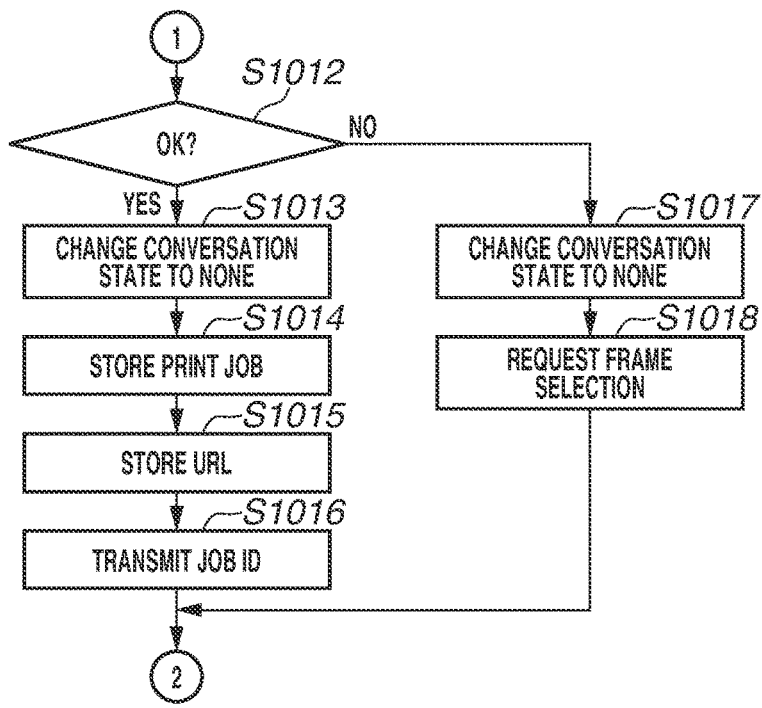

FIGS. 10A and 10B are flowcharts illustrating the processing executed by the bot server 106 when the conversation is posted. More specifically, the CPU 1802 reads and executes a program necessary for the processing in the flowcharts to execute steps in the flowcharts.

When the CPU 1802 receives the user ID of the poster and the message from the server 105, the processing in the flowcharts of FIGS. 10A and 10B is started.

In step S1001, the CPU 1802 determines whether the received user ID of the poster is present in the conversation state storage DB 603. In a case where it is determined in step S1001 that the user ID of the poster is not present in the conversation state storage DB 603 (NO in step S1001), the processing proceeds to step S1003. On the other hand, in a case where it is determined in step S1001 that the user ID of the poster is present in the conversation state storage DB 603 (YES in step S1001), the processing by the CPU 1802 proceeds to step S1002.

In step S1002, the CPU 1802 determines a conversation state of the user ID of the poser based on information stored in the conversation state storage DB 603. In a case where it is determined in step S1002 that the conversation state is "NONE" (NONE in step S1002), the processing by the CPU 1802 proceeds to step S1003. In a case where it is determined in step S1002 that the conversation state is "IMAGE POST WAITING" state (IMAGE POST WAITING in step S1002), the processing proceeds to step S1008. Further, in a case where it is determined in step S1002 that the conversation state is "IMAGE CONFIRMATION WAITING" state (IMAGE CONFIRMATION WAITING in step S1002), the processing proceeds to step S1012.

Subsequently, a case where the processing proceeds to step S1003 is described.

In step S1003, the CPU 1802 determines whether the received message includes a frame ID. In a case where it is determined that the frame ID is not included (NO in step S1003), the CPU 1802 requests frame selection in step S1004.

In a case where it is determined in step S1003 that the frame ID is included (YES in step S1003), in step S1005, the CPU 1802 stores the frame ID included in the message in the selected frame of the conversation state storage DB 603, and in step S1006, changes the conversation state to the image post waiting state. Subsequently, in step S1007, the CPU 1802 transmits a message requesting posting of an image. In other words, the message 907 in FIG. 9 is transmitted.

Subsequently, a case where the processing proceeds to step S1008 is described.

In step S1008, the CPU 1802 determines whether an image is included in the received message. In a case where it is determined in step S1008 that an image is not included (NO in step S1008), the CPU 1802 executes the processing in step S1007 described above.

On the other hand, in a case where it is determined in step S1008 that an image is included (YES in step S1008), in step S1009, the CPU 1802 changes the conversation state in the conversation state storage DB 603 to the confirmation completion waiting state, and creates a combined image in which the image included in the message has been fitted in the selected frame. In step S1010, the CPU 1802 further creates a thumbnail image of the combined image, and in step S1011, transmits a message including the created thumbnail image to request confirmation. In other words, the message 909 in FIG. 9 is transmitted.

Subsequently, a case where the processing proceeds to step S1012 is described.

In step S1012, the CPU 1802 determines whether the OK message 912 has been transmitted. In the case where the user presses the OK button 910 included in the message 909, the OK message 912 is transmitted to the bot server 106. A case where the edit screen 914 is used is described below with reference to FIG. 11.

In step S1012, in a case where it is determined that the OK message 912 has been transmitted (YES in step S1012), in step S1013, the CPU 1802 changes the conversation state of the conversation state storage DB 603 to NONE, and in step S1014, stores the created combined image and the print setting information as the print job in the storage server 107. In a case where the user presses the OK button 910 without displaying the edit screen, an initial set value held by the bot server 106 in advance is stored in the storage server 107 as the print setting information. On the other hand, in a case where the user changes the print setting information using the edit screen, the changed print setting information is stored in the storage server 107.

When the processing in step S1014 is executed, the storage server 107 notifies the bot server 106 of a URL indicating the storage destination in which the print job has been stored.

When receiving the URL from the storage server 107, in step S1015, the CPU 1802 issues the job ID as described above, and stores the job ID in the print job URL management DB 602. Although the hot server 106 manages the job ID and the URL in association with each other in FIG. 8, the bot server 106 may also manage the user ID in association therewith.

In step S1016, the CPU 1802 transmits a message including the job ID (e.g., message 913 in FIG. 9) to the user. The job ID is also referred to as print identification information because the job ID is used to request printing as described below with reference to FIG. 14.

On the other hand, in a case where a cancel button 921 is pressed in FIG. 9, the CPU 1802 determines that step S1012 is NO, changes the conversation state in the conversation state storage DB 603 to NONE in step S1017, and requests frame selection in step S1018. The processing in step S1018 may be changed to request for image selection in place of the frame selection.

FIG. 11 is a flowchart illustrating processing executed by the bot server 106 in a case where the user shifts the screen to the edit screen 914 and the edit end button 919 is pressed in FIG. 9.

In the case where the edit button 911 is pressed in FIG. 9, the bot server 106 provides the edit screen 914. At this time, the browser 920 accesses the bot server 106 using the URL embedded in the edit button 911. The URL embedded in the edit button 911 is dedicated for a target user. Accordingly, the bot server 106 manages the URL of the edit screen and the user ID in association with each other. In addition, the bot server 106 grasps and stores information changed by the user using the edit screen 914 because the operation is performed on the edit screen 914 provided by itself. In a case where the edit end button 919 is pressed, the CPU 1802 checks the conversation state storage DB 603 to determine whether the state is the confirmation completion waiting state in step S1102. In a case where it is determined in step S1102 that the state is not the confirmation completion waiting state (NO in step S1102), the processing ends.

In a case where it is determined in step S1102 that the state is the confirmation completion waiting state (YES in step S1102), in step S1103, the CPU 1802 changes the conversation state of the target user in the conversation state storage DB 603 to NONE. Since the URL of the edit screen and the user ID are managed in an associated manner in the bot server 106 as described above, the CPU 1802 can identify the target user and change the conversation state.

Then, the CPU 1802 corrects the combined image based on the information changed by the user using the edit screen. In addition, in step S1104, the CPU 1802 stores, in the storage server 107, the corrected combined image and the print setting information changed on the edit screen as the print job.

The processing performed in steps S1105 and S1106 is the same as the processing performed in steps S1015 and S1016 described above, and detailed description of the processing is therefore omitted.

Subsequently, the processing executed when the user who has received the job ID in the processing in FIGS. 10A and 10B and FIG. 11 performs printing is described.

Figure 12:
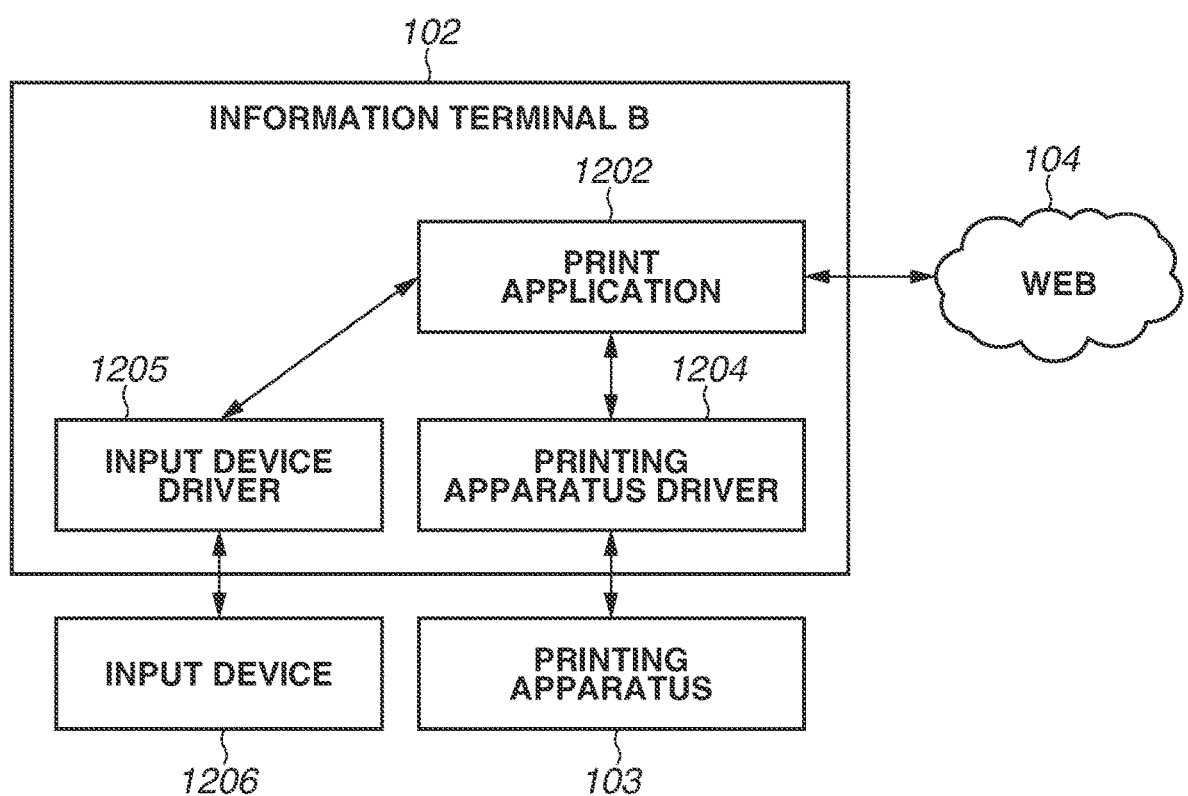
FIG. 12 is a block diagram illustrating a software configuration of an information terminal B.

FIG. 12 is a diagram illustrating a software configuration of the information terminal B 102. A print application 1202 is installed in the information terminal B 102 so that the information terminal B 102 communicates with another device via the web 104. In addition, the printing apparatus 103 is connected to the information terminal B 102. The print application 1202 instructs printing via a printing apparatus driver 1204. Moreover, an input device 1206 is connected to the information terminal B 102, and the user can perform character input to the print application 1202 via an input device driver 1205. In other words, the information terminal B 102 is also referred to as a print instruction apparatus to instruct printing.

Figure 13:
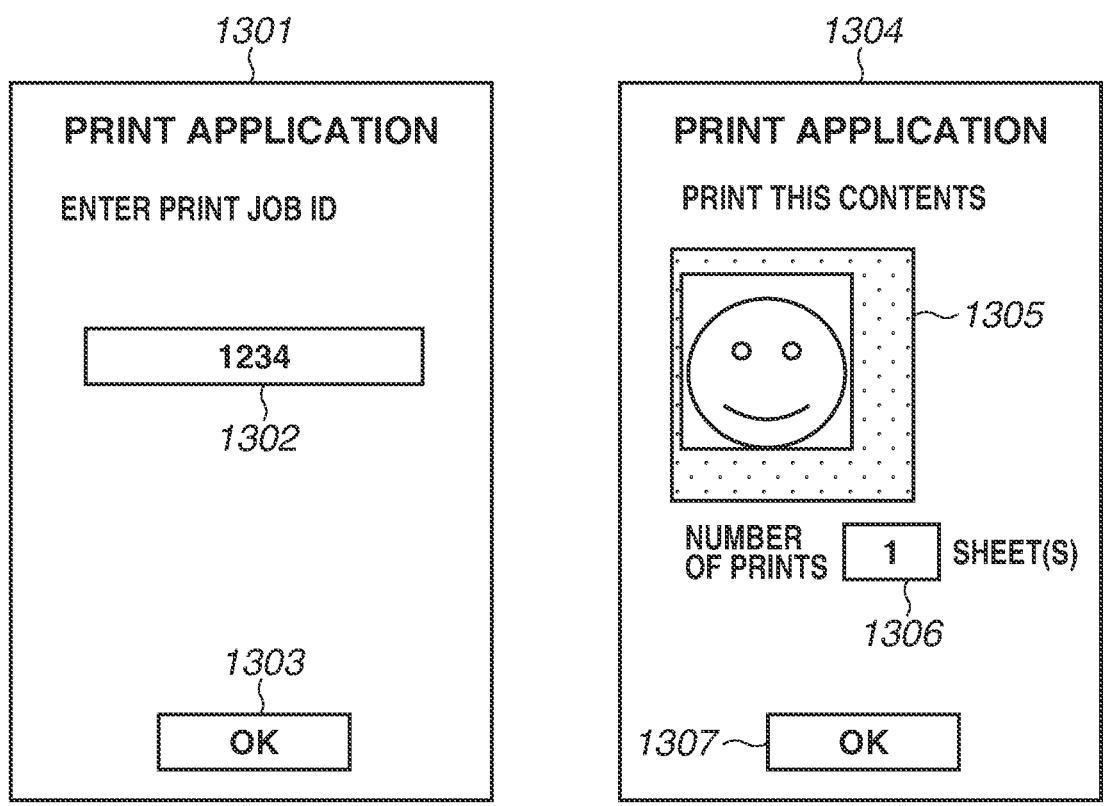
FIG. 13 is a diagram illustrating an example of a confirmation screen.

FIG. 13 illustrates a confirmation screen displayed on a display apparatus of the information terminal B 102. The screen of FIG. 13 is provided by the print application 1202.

When the user who has acquired the job ID in step S1016 of FIG. 10B or in step S1106 of FIG. 11 operates the information terminal B 102 to perform printing, the print application 1202 displays an input screen 1301. The user enters the job ID in a job ID input field 1302, and presses an OK button 1303. In response to the above-described operation, the print application 1202 acquires the print job via the web using the entered job ID, and displays a confirmation screen 1304.

The confirmation screen 1304 includes a preview image of the combined image included in the acquired job. Further, the user enters the number of prints in the number of prints input field 1306 and presses an OK button 1307, so that printing based on the print job is performed.

Figure 14:
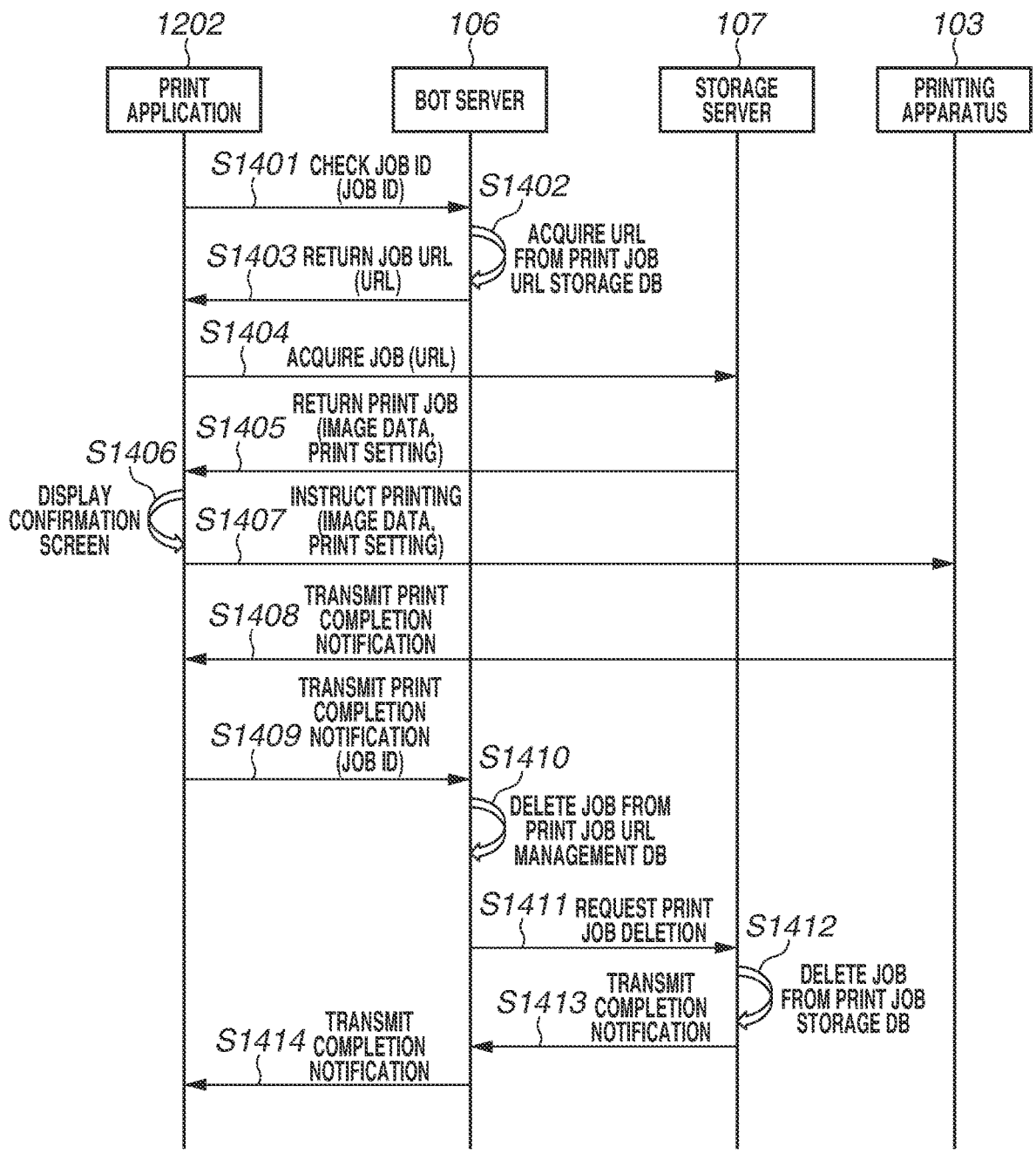
FIG. 14 is a diagram illustrating a processing sequence.

FIG. 14 is a sequence diagram illustrating a sequence performed when the print application 1202 cooperates with the other servers via the web 104.

When the job ID is input on the input screen 1301, in step S1401, the print application 1202 requests the bot server 106 to check the job ID.

When receiving the job ID, the bot server 106 checks whether a URL associated with the received job ID is managed by the print job URL management DB 602. In a case where the received job ID is associated with the URL in steps S1402 and S1403, the bot server 106 acquires the URL and returns the acquired URL.

When the URL is returned, in step S1404, the print application 1202 requests acquisition of the print job using the URL.

In step S1405, the storage server 107 returns the print job stored in the specified URL.

In step S1406, the print application 1202 displays the confirmation screen 1304. When the user performs confirmation and presses the OK button 1307, in step S1407, the print application 1202 instructs the printing apparatus 103 to perform printing. More specifically, the print application 1202 passes the acquired print job to the printing apparatus driver 1204. Then, the printing apparatus driver 1204 converts the print job into print data (page description language (PDL)), and transmits the PDL to the printing apparatus 103.

When the printing is completed, in step S1408, the printing apparatus 103 transmits print completion notification to the print application 1202 via the printing apparatus driver 1204.

When receiving the print completion notification, in step S1409, the print application 1202 transmits the print completion notification including the job ID to the bot server 106.

In step S1410, the bot server 106 specifies the target print job in the print job URL management DB 602 based on the job ID included in the print completion notification, and deletes the target print job from the print job URL management DB 602. Further, in step S1411, the bot server 106 requests the storage server 107 to delete the print job. In step S1412, the storage server 107 deletes the print job from the print job storage DB 605, and in step S1413, notifies the bot server 106 of work completion.

In response thereto, in step S1414, the bot server 106 also transmits the work completion notification to the print application 1202.

Through the above-described processing, the user can easily issue the print job by performing the conversation with the bot server on the communication application 108, and can perform a detailed print setting on the web browser. In addition, in a case where the user does not own a printer or at a visiting place, the user can perform printing by looking for the information terminal B 102 in which the print application is installed and by entering the print job ID.

Figure 15:
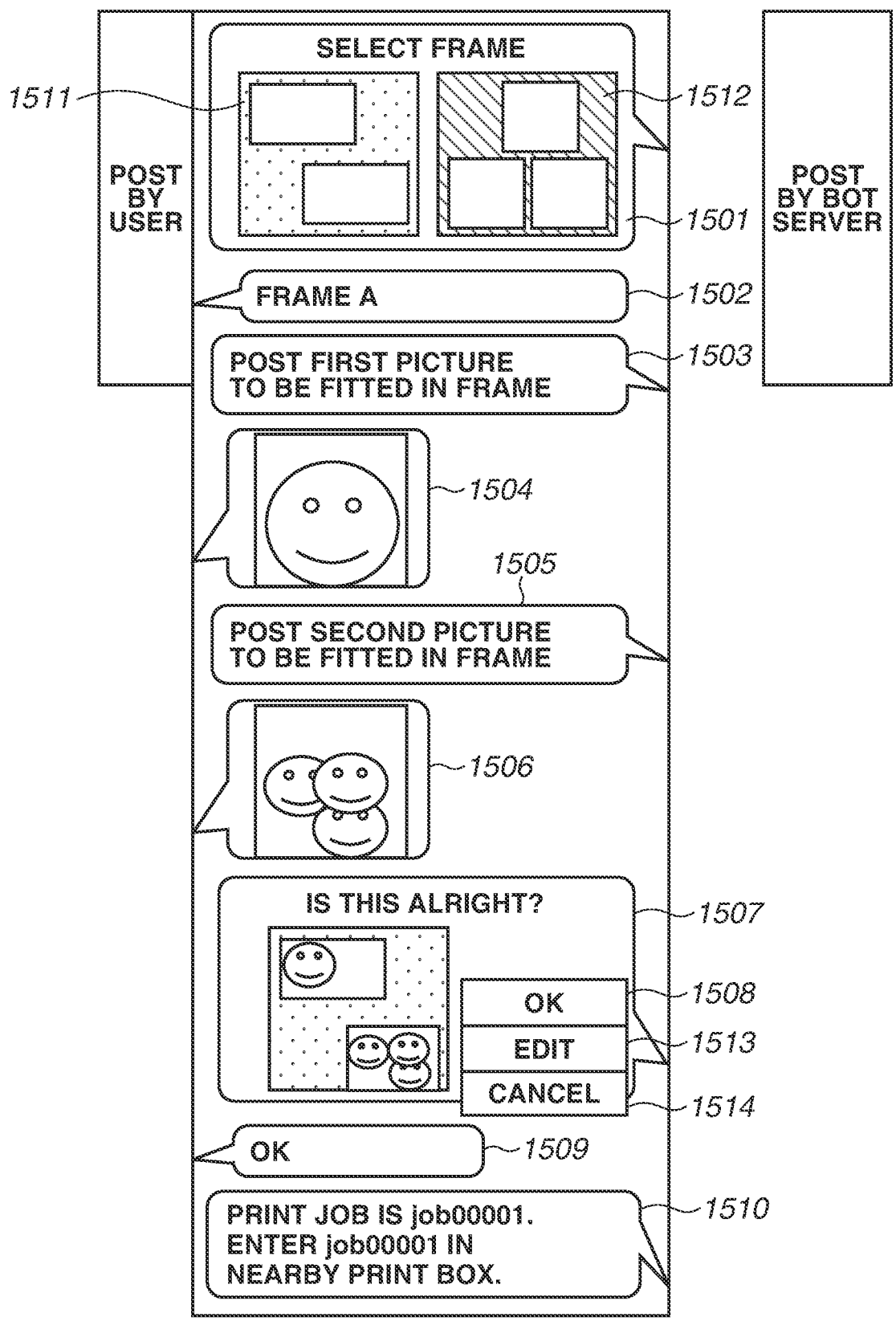
FIG. 15 is a diagram illustrating an example of the conversation screen provided by the communication application.

FIG. 15 illustrates an example of a conversation screen according to a second exemplary embodiment.

In the second exemplary embodiment, as a message 1501 to prompt the user to select a frame, a message including a frame into which a plurality of pictures can be inserted is transmitted. In a case where the user transmits a message 1502 that includes a frame ID of a frame 1511 into which two pictures can be inserted, the bot server 106 posts a message 1503 to request transmission of a first picture. In response to the message 1503, the user transmits a message 1504 including the first picture.

Then, the bot server 106 transmits a message 1505 to request transmission of a second picture, and the user transmits a message 1506 including the second picture. In a case where the frame 1512 is selected, the bot server 106 further transmits a message to request transmission of a third picture. As the message to request transmission of a picture, a message specifying the number of pictures necessary for the selected frame may be transmitted. For example, the bot server 106 may transmit a message indicating "POST TWO PICTURES" in the case where the frame 1511 is selected, and the bot server 106 may transmit a message indicating "POST THREE PICTURES" in the case where the frame 1512 is selected.

Then, the bot server 106 creates a thumbnail image of a combined image in which two pictures have been fitted in the selected frame, and transmits a confirmation message 1507 to the user. When the user presses an OK button 1508, an OK message 1509 is transmitted to the bot server 106, and the bot server 106 issues the job ID. The messages 1503 and 1505 are also referred to as request messages.

FIG. 16 illustrates data in the conversation state storage DB according to the second exemplary embodiment. In the present exemplary embodiment, a user state is stored as structured data called JavaScript Object Notation (JSON).

For example, a state of a user 0001 is NONE, and accordingly, selected frame information is not present.

A user 0002 is in a state immediately after the user 0002 has selected the frame 1511 (frame A). Accordingly, the selected frame information is stored, and a slot list to store two images corresponding to the number of slots of the frame is prepared.

A user 0003 is in a state after the user 0003 has selected the frame 1511 (frame A) and has transmitted a first image. Accordingly, a file name of the image transmitted by the user is stored as a first item in the slot list, and a second item is null because a second image has not been received yet. A user 0004 is in a state immediately after the user 0004 has selected the frame 1512 (frame B). Since the frame 1512 includes three slots, a slot list for three items is prepared. The user 0004 has transmitted no picture. Accordingly, null is entered in all of the slots.

Figure 17A:
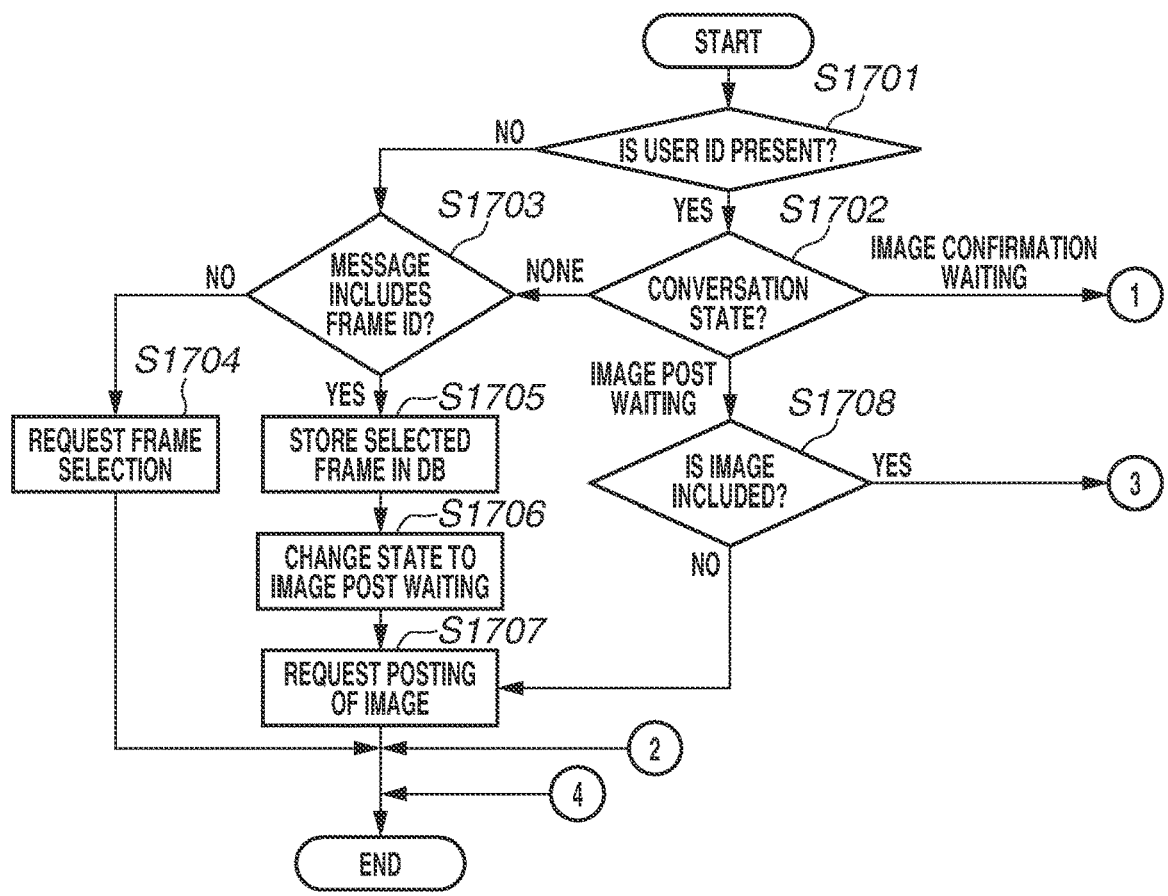
FIGS. 17A and 17B are flowcharts illustrating processing executed by the bot server.
Figure 17B:
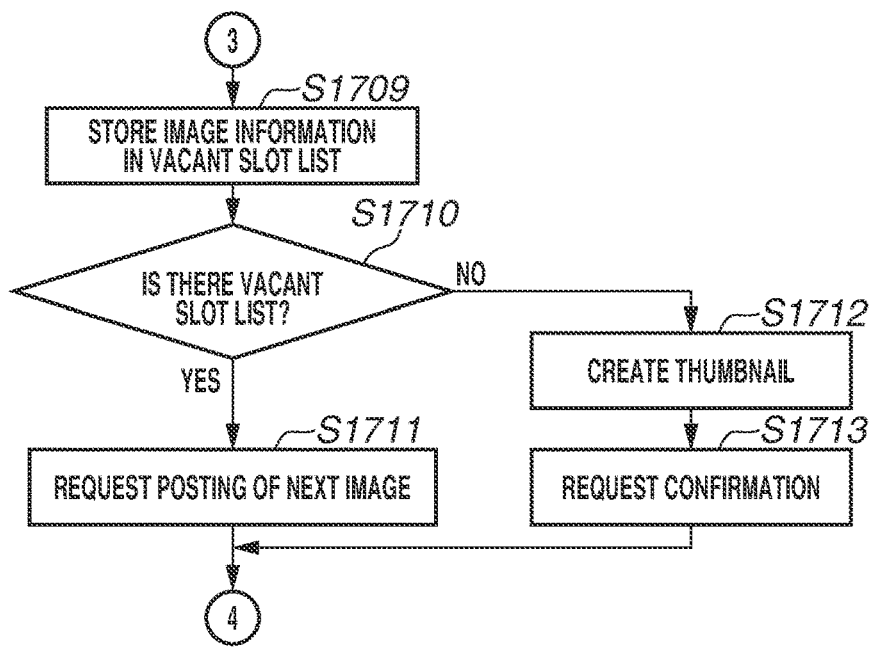

FIGS. 17A and 17B are flowcharts illustrating processing executed by the bot server according to the second exemplary embodiment.

The processing in steps S1701 to S708 is the same as the processing in steps S1001 to S1008 in FIG. 10A, and detailed description of the processing is therefore omitted.

In a case where it is determined as YES in step S1708, in step S1709, the CPU 1802 stores image information (e.g., file name) of the transmitted image in a vacant slot list in the conversation state storage DB 603.

In step S1710, the CPU 1802 determines whether there is a vacant slot list. In a case where it is determined that there is the vacant slot list (YES in step S1710), in step S1711, the CPU 1802 transmits a message to request posting of a next image.

In a case where it is determined in step S1710 that there is no vacant slot list (NO in step S1710), the CPU 1802 acquires images based on the image information stored in the slot list. Then, in step S1712, the CPU 1802 fits the acquired images in the selected frame to create a combined image, and creates a thumbnail of the combined image. Then, in step S1713, the CPU 1802 requests confirmation. More specifically, the CPU 1802 transmits the message 1507 in FIG. 15.

The processing in a case where it is determined in step S1702 that the state is the image confirmation waiting state is the same as the processing in steps S1012 to S1018 of FIG. 10B, and a detailed description of the processing is therefore omitted.

Further, the processing when the user who has acquired the job ID requests the printing is the same as the processing in FIG. 14.

In the case where the number of images combinable to the frame selected by the user is one, the CPU 1802 transmits the request message to request an image once during the above-described processing. On the other hand, in the case where a plurality of images is combinable to the frame selected by the user, the CPU 1802 transmits the request message to request an image the number of times corresponding to the number of the plurality of images combinable to the frame. Accordingly, the user can easily grasp the number of pictures necessary for the frame selected in the communication application 108, which improves user operability.

In the present exemplary embodiment, the thumbnail creation processing is not executed until there is no vacant slot list; however, the user may instruct the thumbnail creation processing to execute the processing in step S1712 even in a state where there is a vacant slot list.

Figure 19:
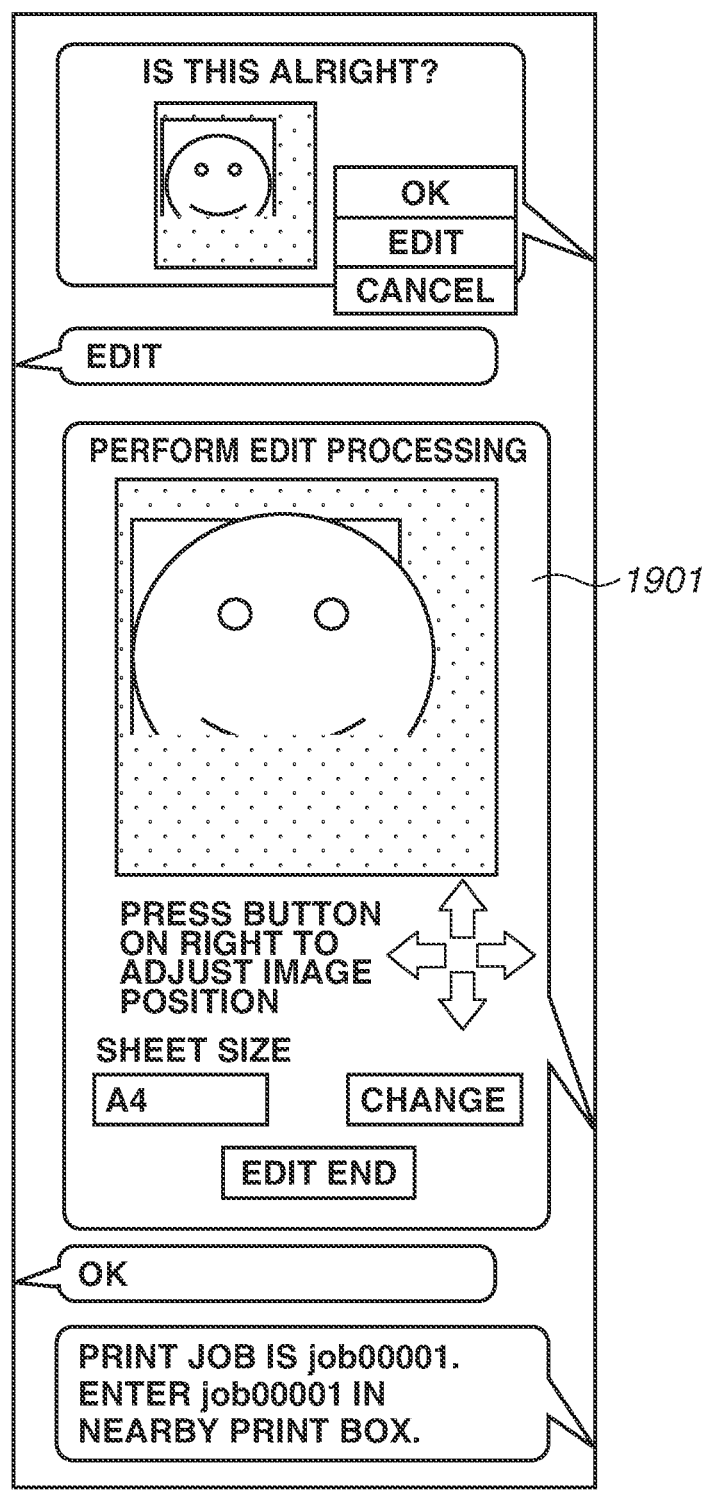
FIG. 19 is a diagram illustrating an example of the conversation screen provided by the communication application.

In the description of the first and second exemplary embodiments, the edit screen 914 is displayed on the browser application different from the communication application; however, the edit screen 914 may be displayed in another form. For example, as illustrated in FIG. 19, a message similar to the message 909 in FIG. 9 is displayed on the conversation screen of the communication application 108, and in a case where the edit button is pressed at this time, a message indicating editing is transmitted to the bot server 106. In response to the message, the bot server 106 may transmit a message 1901 of FIG. 19. When the user adjusts the position of the image and changes the print setting information using items included in the message 1901 of FIG. 19, and presses an edit end button, the communication application transmits a message corresponding to the changed contents to the bot server 106. Based on this message, the bot server 106 can grasp the contents changed by the user and generate a print job. On the edit screen 914, both adjustment of the image position and change of the print setting information are received; however, the screen may receive at least one of the adjustment of the image position and the change of the print setting information.

Moreover, the above-described exemplary embodiments may be directed to the following. Since the change of the print setting information and printing can be instructed using the communication application 108 that is frequently used, the above-described exemplary embodiments are directed to improvement of usability of the user.

The above-described exemplary embodiments can also be achieved by supplying software (program) achieving the functions of the above-described exemplary embodiments to a system or an apparatus via a network or various kinds of storage media, and causing a computer (CPU, microprocessor unit (MPU), processor, etc.) of the system or the apparatus to read and execute the program. In addition, the program may be executed by one computer or by a plurality of computers in cooperation with one another. It is not necessary to achieve all of the above-described processing by the software, and a part or all of the processing may be achieved by hardware such as an application specific integrated circuit (ASIC). As for the CPU, a single CPU may execute all of the processing or a plurality of CPUs may execute the processing while appropriately cooperating with one another.

According to the present disclosure, it is possible for the user to easily grasp the number of images necessary, which allows for improvement of operability.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-025492, filed Feb. 15, 2018, which is hereby incorporated by reference herein in its entirety.

What is claimed is:

1. An information processing apparatus that communicates, via a network, with a user terminal in which a communication application is installed, the information processing apparatus comprising:
   a first transmission unit configured to transmit a response text message to the user terminal in a case where a text message is received from the user terminal by using the communication application, wherein the response text message is displayed on a screen of the communication application;
   a second transmission unit configured to transmit, via the network, a request message to request transmission of a plurality of images, wherein the request message is displayed on the screen of the communication application;
   a reception unit configured to receive the plurality of images after transmission of the request message; and
   a third transmission unit configured to transmit one piece of identification information corresponding to the plurality of images based on an event that a first option is selected from the first option and a second option displayed on the screen of the communication application after transmission of the plurality of images, wherein the one piece of identification information is displayed on the screen of the communication application;
   wherein the plurality of images is printed by a printing apparatus in a case where the one piece of identification information is inputted into a print instruction apparatus, and
   wherein the first transmission unit, the second transmission unit, the reception unit, and the third transmission unit are implemented by at least one processor of the information processing apparatus.

2. The information processing apparatus according to claim 1, further comprising a providing unit configured to provide an edit screen in a case where a confirmation message that includes a thumbnail image of a combined image that is a combination of the plurality of images and an edit instruction item is transmitted to the user terminal and the edit instruction item is operated in the user terminal,
  wherein the edit screen is displayed based on a browser application different from the communication application in the user terminal,
  wherein the providing unit is implemented by the at least one processor of the information processing apparatus.

3. The information processing apparatus according to claim 2,
  wherein a uniform resource locator (URL) is associated with the edit instruction item, and
  wherein, in the case where the edit instruction item is instructed on the user terminal, the providing unit provides the edit screen corresponding to the URL.

4. The information processing apparatus according to claim 2, wherein the edit screen receives change of print setting information.

5. The information processing apparatus according to claim 4, wherein the edit screen includes, as print setting information that can be changed, at least one of a sheet size, a sheet type, double-sided print setting, single-sided print setting, and color information.

6. The information processing apparatus according to claim 1,
  wherein the second transmission unit transmits, in a case where one image is combinable to a frame selected by a user, the request message to request an image once,
  wherein the second transmission unit transmits, in a case where a plurality of images is combinable to the frame selected by the user, the request message, to request an image, the number of times corresponding to the number of the plurality of images combinable to the frame, and
  wherein the request message is displayed on the screen of the communication application.

7. The information processing apparatus according to claim 1,
  wherein the second transmission unit transmits, in a case where one image is combinable to a frame selected by the user, a first request message to request one image, and
  wherein the second transmission unit transmits, in a case where a plurality of images is combinable to the frame selected by the user, a second request message to request the plurality of images combinable to the frame,
  wherein the first request message is displayed on the screen of the communication application in a case where the first request message is transmitted, and
  wherein the second request message is displayed on the screen of the communication application in a case where the second request message is transmitted.

8. The information processing apparatus according to claim 1,
  wherein the third transmission unit transmits, in a case where the plurality of images is received by the information processing apparatus, the one piece of identification information to the user terminal,
  wherein in a case where the one piece of identification information is received by the information processing apparatus, a print job corresponding to the one piece of identification information is transmitted to the print instruction apparatus that has transmitted the one piece of identification information, and
  wherein processing based on the print job is executed, in a case where the print instruction apparatus receives the print job, by a printing apparatus connected to the print instruction apparatus.

9. The information processing apparatus according to claim 1, wherein, in a case where the second option is selected, the one piece of identification information is not displayed on the screen of the communication application.

10. The information processing apparatus according to claim 1, wherein the printing apparatus executes the print processing by an electro photographic system.

11. A control method executed by an information processing apparatus configured to communicate, via a network, with a user terminal in which a communication application is installed, the method comprising:
  transmitting a response text message to the user terminal in a case where a text message is received from the user terminal by using the communication application, wherein the response text message is displayed on a screen of the communication application;
  transmitting, via the network, a request message to request transmission of a plurality of images, wherein the request message is displayed on the screen of the communication application; and
  receiving the plurality of images after transmission of the request message; and
  transmitting one piece of identification information corresponding to the plurality of images based on an event that a first option is selected from the first option and a second option displayed on the screen of the communication application after transmission of the plurality of images, wherein the one piece of identification information is displayed on the screen of the communication application,
  wherein the plurality of images are printed by a printing apparatus in a case where the one piece of identification information is inputted into a print instruction apparatus.

12. The control method according to claim 11, further comprising providing an edit screen in a case where a confirmation message that includes a thumbnail image of a combined that is a combination of plurality of images image and an edit instruction item is transmitted to the user terminal and the edit instruction item is operated on the user terminal,
  wherein the edit screen is displayed based on a browser application different from the communication application in the user terminal.

13. The control method according to claim 12,
  wherein a URL is associated with the edit instruction item, and
  wherein the edit screen corresponding to the URL is provided, in the case where the edit instruction item is operated on the user terminal.

14. The control method according to claim 12, wherein the edit screen receives change of print setting information.

15. The control method according to claim 14, wherein the edit screen includes, as print setting information that can be changed, at least one of a sheet size, a sheet type, double-sided print setting, single-sided print setting, and color information.

16. The control method according to claim 11,
  wherein the request message to request an image is transmitted once, in a case where one image is combinable to a frame selected by a user,
  wherein the request message to request an image is transmitted, in a case where a plurality of images is combinable to the frame selected by the user, the number of times corresponding to the number of the plurality of images combinable to the frame, and wherein the request message is displayed on the screen of the communication application.

17. The control method according to claim 11, wherein the request message to request one image is transmitted, in a case where one image is combinable to a frame selected by the user, and wherein the request message to request the plurality of images combinable to the frame is transmitted, in a case where a plurality of images is combinable to the frame selected by the user wherein the request message is displayed on the screen of the communication application in a case where the request message is transmitted, and wherein the request message is displayed on the screen of the communication application in a case where the request message is transmitted.

18. The control method according to claim 11, wherein the one piece identification information is transmitted to the user terminal, in a case where the plurality of images is received by the information processing apparatus, wherein, in a case where the one piece of identification information is received by the information processing apparatus, a print job corresponding to the one piece identification information is transmitted to the print instruction apparatus that has transmitted the one piece identification information, and wherein processing based on the print job is executed, in a case where the print instruction apparatus receives the print job, by a printing apparatus connected to the print instruction apparatus.

19. The control method according to claim 11, wherein, in a case where the second option is selected, the one piece of identification information is not displayed on the screen of the communication application.

20. The control method according to claim 11, wherein the printing apparatus executes the print processing by an electro photographic system.

21. A system comprising an information processing apparatus and a printing apparatus, wherein the information processing apparatus communicates, via a network, with a user terminal in which a communication application is installed:

the information processing apparatus comprising a first transmission unit configured to transmit a response text message to the user terminal in a case where a text message is received from the user terminal by using the communication application, wherein the response text message is displayed on a screen of the communication application;

a second transmission unit configured to transmit, via the network, a request message to request transmission of a plurality of images, wherein the request message is displayed on the screen of the communication application;

a reception unit configured to receive the plurality of images after transmission of the request message; and a third transmission unit configured to transmit one piece of identification information corresponding to the plurality of images based on an event that a first option is selected from the first option and a second option displayed on the screen of the communication application after transmission of the plurality of images, wherein the one piece of identification information is displayed on the screen of the communication application;

wherein the first transmission unit, the second transmission unit, the reception unit, and the third transmission unit are implemented by at least one processor of the information processing apparatus, the printing apparatus comprising:

a print control unit configured to perform print processing based on the plurality of images in a case where the one piece of identification information is inputted into a print instruction apparatus, and wherein the print control unit is implemented by at least one processor of the printing apparatus.

22. The system according to claim 21, wherein, in a case where the second option is selected, the one piece of identification information is not displayed on the screen of the communication application.

23. The system according to claim 21, wherein the printing apparatus executes the print processing by an electro photographic system.

* * * * *